United States Patent
Huang et al.

(10) Patent No.: US 8,738,924 B2
(45) Date of Patent: May 27, 2014

(54) ELECTRONIC SYSTEM AND DIGITAL RIGHT MANAGEMENT METHODS THEREOF

(75) Inventors: Zhun Huang, Taipei (TW); Jiin Lai, Taipei (TW)

(73) Assignee: Via Technologies, Inc., Hsin-Tien, Taipei (TW)

( * ) Notice: Subject to any disclaimer, the term of this patent is extended or adjusted under 35 U.S.C. 154(b) by 1516 days.

(21) Appl. No.: 12/107,206

(22) Filed: Apr. 22, 2008

(65) Prior Publication Data

US 2008/0313471 A1   Dec. 18, 2008

Related U.S. Application Data

(60) Provisional application No. 60/943,634, filed on Jun. 13, 2007, provisional application No. 60/948,003, filed on Jul. 5, 2007.

(51) Int. Cl.
  *H04L 9/32* (2006.01)
(52) U.S. Cl.
  USPC ........... 713/185; 713/181; 713/187; 713/188; 380/47; 380/227; 380/277
(58) Field of Classification Search
  USPC ............................................ 726/27; 713/185
  See application file for complete search history.

(56) References Cited

U.S. PATENT DOCUMENTS

| | | | |
|---|---|---|---|
| 7,783,887 B2 * | 8/2010 | Lewis et al. | 713/176 |
| 2004/0039906 A1 * | 2/2004 | Oka et al. | 713/156 |
| 2004/0117309 A1 * | 6/2004 | Inoue et al. | 705/50 |
| 2005/0154921 A1 * | 7/2005 | Medvinsky | 713/201 |
| 2007/0130452 A1 * | 6/2007 | Muir | 713/1 |
| 2008/0115224 A1 * | 5/2008 | Jogand-Coulomb et al. | 726/27 |

FOREIGN PATENT DOCUMENTS

CN   1877593   12/2006

OTHER PUBLICATIONS http://www.webopedia.com/TERM/C/chipset.html "chipset" Jun. 2012.*
http://www.amd.com/us/Documents/Motherboard_Catalog_with_AMD_Chipsets_March_2007_(Low_res).pdf "Motherboards with AMD IGP Chipset"—Mar. 2007, AMD.*
http://application-notes.digchip.com/001/1-2827.pdf "bq20z80A-V110+bq29312A Chipset Technical Reference Manual"—Texas Instruments, Jul. 2007.*
CN Office Action mailed Aug. 14, 2009.
English abstract of CN1877593.

* cited by examiner

*Primary Examiner* — Randy Scott
(74) *Attorney, Agent, or Firm* — McClure, Qualey & Rodack, LLP

(57) ABSTRACT

An electronic system is provided, in which a smart chip, a smart chip controller, a processor, a system memory, and an access management module is provided. The smart chip controller communicates with the smart chip. The processor performs a mutual authentication with the smart chip. The system memory is accessible to the smart chip and the processor. The access management module is coupled between the processor and the smart chip controller. The access management module prevents the processor accessing a certain range of the system memory according to a block command from the smart chip controller, in response of that the mutual authentication between the processor and the smart chip is failed.

8 Claims, 5 Drawing Sheets

ELECTRONIC SYSTEM AND DIGITAL RIGHT MANAGEMENT METHODS THEREOF

CROSS REFERENCE TO RELATED APPLICATIONS

This application claims the benefit of U.S. Application No. 60/943,634, filed Jun. 13, 2007, and entitled "SECURE ARCHITECTURE USING SMART CARD", and U.S. Application No. 60/948,003, filed Jul. 5, 2007, and entitled "SECURE ARCHITECTURE USING EXTERNAL PROCESSOR".

BACKGROUND OF THE INVENTION

1. Field of the Invention

The invention relates to electronic systems, and in particular to an electronic system capable of blocking an unauthorized third party to access important data and digital right management methods thereof.

2. Description of the Related Art

Generally, an electronic system, such as a personal computer, comprises one or more central processing unit(s) to handle all tasks such as executing operation system (OS), application programs or other software program stored in the storage memory, retrieving data over the Internet, reading files from various storage media and the like. Hence, once the CPU executes a spite program distributed by hackers, the CPU cannot work normally and important personal information or data in the electronic system may be accessed by an unauthorized third party via the CPU.

BRIEF SUMMARY OF THE INVENTION

Embodiments of an electronic system are provided, in which a system memory is provided, a CPU downloads an encrypted digital content and a right object associated to the encrypted digital content into the system memory, a smart chip validates the right object to obtain a content key, and a chipset comprises a cryptographic engine to decrypt the encrypted digital content according to the content key from the smart chip.

The invention provides an embodiment of a digital right management method of an electronic system, in which the electronic system comprises a central processing unit (CPU), a chipset, a smart chip and a system memory. A piece of encrypted digital content is download into the system memory by the CPU, and a right object associated to the encrypted digital content is download into the system memory by the CPU. The right object is validated to obtain a content key and the content key is set to a cryptographic engine in the chipset by the smart chip, and the digital content is decrypted by the cryptographic engine.

The invention provides an embodiment of digital right management method of an electronic system. The electronic system comprises a central processing unit (CPU), a chipset, a smart chip and a system memory. The method comprises following steps: downloading a piece of encrypted digital content into the system memory by the CPU; downloading a right object associated to the encrypted digital content to the system memory by the CPU; validating the right object to obtain a content key by the smart chip; setting the content key to a cryptographic engine in the chipset; and decrypting the digital content by the cryptographic engine.

The invention further provides another embodiment of an electronic system. The electronic system comprises a smart chip, a smart chip controller, a processor, a system memory, and an access management module. The smart chip controller communicates with the smart chip. The processor performs a mutual authentication with the smart chip. The system memory is accessible to the smart chip and the processor. The access management module is coupled between the processor and the smart chip controller. The access management module prevents the processor accessing a certain range of the system memory according to a block command from the smart chip controller, in response of that the mutual authentication between the processor and the smart chip is failed.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
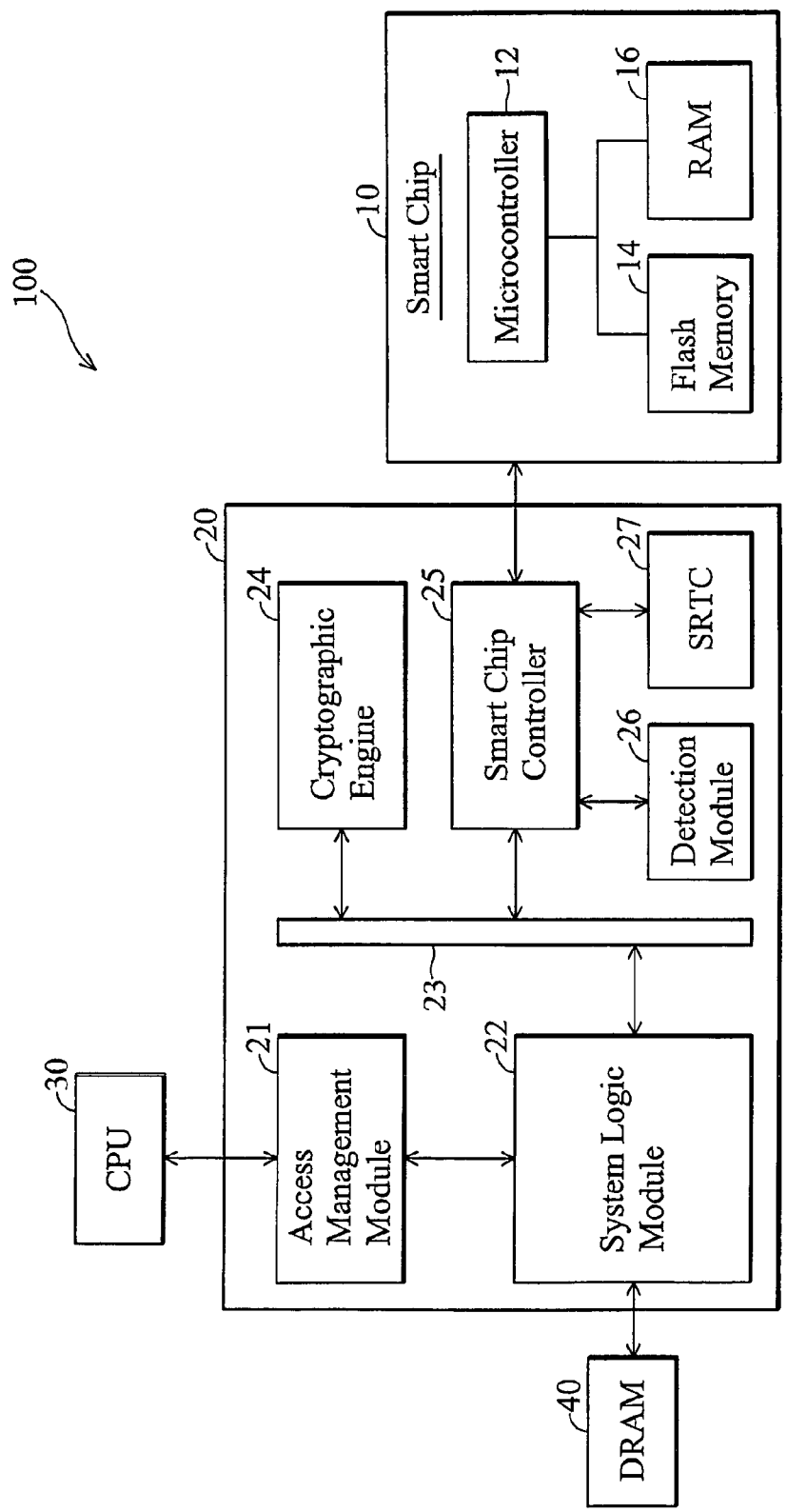
FIG. 1 shows an embodiment of an electronic system.

FIG. 1 shows an embodiment of an electronic system. As shown, the electronic system 100 is implemented as a computer system but is not limited thereto. For example, the electronic system 100 can also be implemented as a smart phone, an ultra mobile personal computer (UMPC), a portable TV, and the like. The electronic system 100 comprises a smart chip 10, a chipset 20, a central processing unit (CPU) 30 and a dynamic random access memory (DRAM) 40.

The smart chip 10 contains a general purpose microcontroller (or MCU) 12, a nonvolatile flash memory 14 and a volatile random access memory (RAM) 16. The general purpose microcontroller 12 executes programs stored and loaded in the flash memory and the RAM 14, and the RAM 16 stores internal intermediate data and loaded programs temporarily. After being powered on, a mutual authentication between the smart chip 10 and the chipset 20 is performed, then the smart chip 10 starts to execute the codes (or programs) stored in the flash memory 14 or external nonvolatile storage if the digital signature of the external codes (or programs) can be verified. The smart chip 10, for example, can be a smart card, but is not limited thereto.

The smart chip 10 does not entrust the CPU 30 and only assigns the CPU 30 insensitive tasks, such as retrieving data over the Internet, reading files from various storage media and the like. In some embodiments, the smart chip 10 and the chipset 20 can be bonded, i.e., each chipset can only work with one specific smart chip. This restriction may be removed if public key infrastructure (PKI) is supported. In some embodiments, the smart chip 10 stores a public key and a unique user key is provided by the digital content vender, and the user key is used to identify users.

The chipset 20 comprises an access management module 21, a system logic module 22, a bus 23, a cryptographic engine 24, a smart chip controller 25 and a detection module 26 and a secure real time counter (SRTC) 27. The access management module 21 is coupled between the CPU 30 and the system logic module 22. The access management module 21 blocks prohibited operations performed by CPU 30 (software) to protect critical components in the chipset 20. Namely, the access management module 21 discards any downstream requests to a certain protected address range configured by the smart chip controller 25.

The system logic module 22 is coupled to the access management module 21, the bus 23 and the DRAM 40. The system logic module 22 has common functions of ordinary chipsets. The system logic module 22 supports a degraded mode and a locked mode. When it receives specific commands from the smart chip 10, some chipset functions can be disabled. The bus 23 is coupled to system logic module 22, the cryptographic engine 24, the smart chip controller 25, the detection module 26 and the SRTC 27. For example, the bus 23 can be a PCI-like secure bus, but is not limited thereto.

The smart chip controller 25 is coupled to smart chip 10, the bus 23, the detection module 26 and the SRTC 27. For example, the smart chip controller 25 can be a master device attached to the bus 23. The smart chip controller 25 translates commands sent by the smart chip 10 into corresponding bus cycles or special actions, and vice versa. For example, the smart chip controller 25 reads and writes DRAM 40 via the system logic module 22 and generates interrupt signals to the smart chip 10 and the CPU 30. In addition, the smart chip controller 25 enforces some security policies comprising locking the chipset in a degraded mode before the smart chip 10 is presented and authenticated. The cryptographic engine 24 is an acceleration engine for various cryptographic algorithms. For example, the cryptographic engine 24 reads data from the DRAM 40 via the system logic module 22, performs a cryptographic operation requested by the smart chip controller 25, and writes the result back to the DRAM 40. The cryptographic engine 24 never exposes any secret information to the CPU 30 or any other device.

The detection module 26 detects the hardware environment of the electronic system 100. For example, the detection module 26 detects excursions of the external bus clock, core and bus voltages and temperature. The SRTC 27 provides trusted time information. In this embodiment, the detection module 26 and the SRTC 27 are dedicated to the smart chip controller 25, i.e., the detection module 26 and the SRTC 27 can be only accessed by the smart chip controller 25. The CPU 30 executes operation system (OS), application programs or other software program stored in the storage memory, such as the DRAM 40, a nonvolatile memory or removable media.

Figure 2:
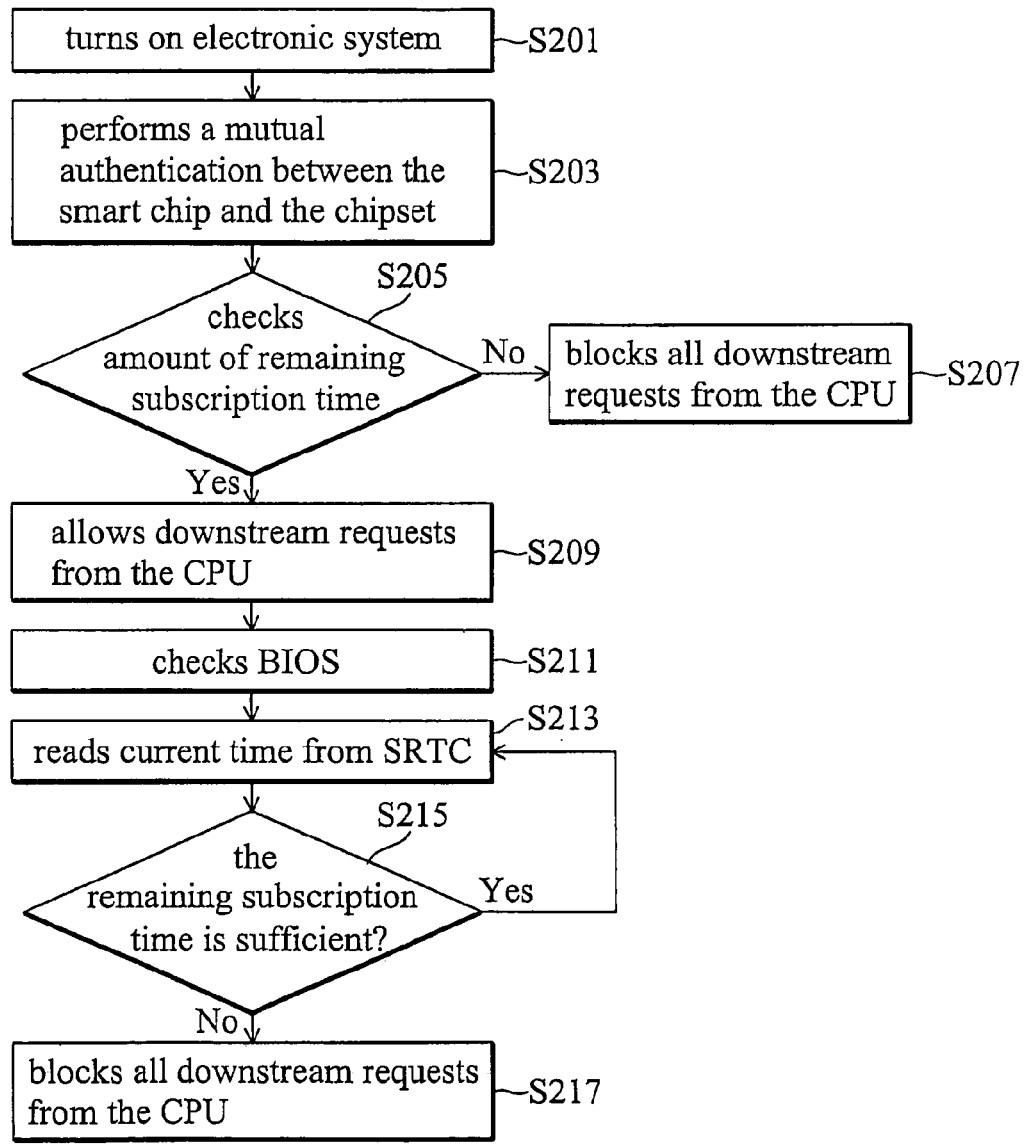
FIG. 2 shows a flowchart illustrating booting up of the electronic system shown in FIG. 1.

FIG. 2 shows a flowchart illustrating booting up of the electronic system shown in FIG. 1.

In step S201, the electronic system 100 is turned on. For example, user turns on the electronic system 100, and the smart chip controller 25 sends a lock command to the access management module 21 upon powering up. When receiving the lock command, the access management module 21 blocks all downstream requests from the CPU 30.

In step S203, a mutual authentication between the smart chip 10 and the chipset 20 is performed. For example, the authentication protocol is initiated, when the smart chip 10 is presented (i.e., is connected to the smart chip controller 25). The smart chip 10 responds to the mutual authentication protocol.

In step S205, amount of remaining subscription time is checked. For example, the smart chip controller 25 sends a polling command to poll the smart chip 10, and then the smart chip 10 checks the amount of remaining subscription time which may be stored in the flash memory 14. If the remaining subscription time (i.e., computer use time) is sufficient, the smart chip 10 responds a first command (UNLOCK command) to the smart chip controller 25. On the contrary, the access management module 21 will maintain blocking of all downstream requests from the CPU 30, if the remaining subscription time is insufficient.

In step S209, the smart chip controller 25 sends a third command to the access management module 21 when receiving the first command, such that the access management module 21 allows downstream requests from the CPU 30, but the access management module 21 does not allow the CPU 30 to write BIOS (not shown). It should be noted that the full access right to the BIOS must be granted by the smart chip 10 separately.

In step S211, the BIOS is checked. The CPU 30 starts to work when the smart chip 10 is checking the BIOS. For example, the BIOS is checked by the smart chip 10 and detailed operations are later discussed.

In step S213, current time is read from SRTC 27. For example, the smart chip controller 25 polls (i.e. sends a polling command to) the smart chip 10, and then the smart chip 10 responds a fourth command (GET_TIME command). When receiving the fourth command, the smart chip controller 25 reads the current time from the SRTC 27 and then sends a fifth command (TIME command) along with the correct time to the smart chip 10. The smart chip 10 receives the current time and deducts it from the subscription time.

In step S215, whether the remaining subscription time is sufficient is determined. For example, the smart chip controller 25 polls the smart chip 10, and then the smart chip 10 checks the amount of remaining subscription time. If the user has sufficient subscription time, the smart chip 10 sends a sixth command (NOP command) to the smart chip controller 25, and the steps S213 and S215 are repeated. On the contrary, the smart chip 10 sends the second command to the smart chip controller 25, if the subscription time is insufficient. Next, the smart chip controller 25 will send the lock command to the access management module 21 again.

In step S217, all downstream requests from the CPU 30 are blocked. For example, when receiving the lock command from the smart chip controller 25, the access management module 21 blocks all downstream requests from the CPU 30.

Figure 3:
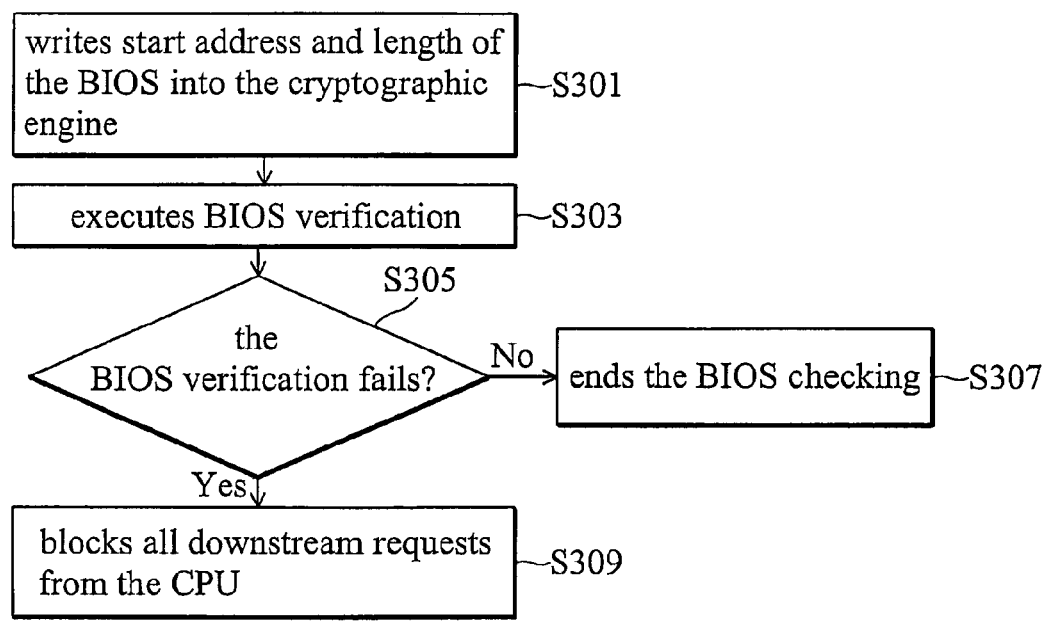
FIG. 3 shows a flowchart illustrating step of checking BIOS in FIG. 2.

FIG. 3 shows a flowchart illustrating step of checking BIOS in FIG. 2.

In step S301, start address and length of the BIOS are written into the cryptographic engine 24. For example, the smart chip controller 25 polls the smart chip 10, and then the smart chip 10 responds a seventh command (WRITE MEMORY command) to write the start address and length of the BIOS in to corresponding control register of the cryptographic engine 24.

In step S303, BIOS verification is executed. For example, the smart chip controller 25 polls the smart chip 10, and the smart chip 10 responds an eighth command (WRITE MEMORY command) to write the control register of the cryptographic engine so as to start the BIOS verification, and then the smart chip controller 25 instructs the cryptographic engine 24 to verify the BIOS.

In step S305, whether the BIOS verification fails is determined. For example, the smart chip controller 25 polls the smart chip 10, and then the smart chip 10 responds a ninth command (READ MEMORY command) to read (load) the verification result. The smart chip controller 25 polls the smart chip 10, and if the BIOS verification fails, the smart chip 10 responds the second command to the smart chip controller 25. On the contrary, if the BIOS verification passes, step S307 is executed to end the BIOS checking.

In step S309, all downstream requests from the CPU 30 are blocked. For example, the smart chip controller 25 sends the lock command to the access management module 21 such that the access management module 21 blocks all downstream requests from the CPU 30 when receiving the second command from the smart chip 10. Thus, the chipset 20 is locked and the CPU 30 ceases to work.

Figure 4:
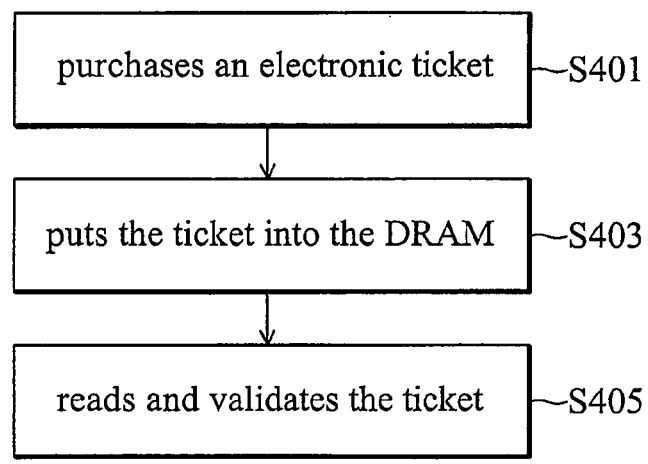
FIG. 4 shows a flowchart illustrating a method for adding computer use time of the electronic system.

FIG. 4 shows a flowchart illustrating a method for adding computer use time of the electronic system.

In step S401, an electronic ticket is purchased. For example, the user purchases an electronic ticket, i.e., downloads an encrypted and signed packet from a server or removable media.

In step S403, the ticket is put into the DRAM 40. For example, the software on the CPU 30 puts the ticket into the DRAM 40 and writes the address of the ticket to a special memory mapped register to notify the smart chip controller 25.

In step S405, the ticket is read (loaded) and validated. For example, the smart chip controller 25 sends a tenth command (CPU CALL command) to the smart chip 10, such that smart chip 10 reads (or loads) the ticket into its internal memory and validates it. When the ticket is a valid ticket, the smart chip 10 adds computer use time and records the serial number of the ticket into flash memory 14 to avoid replay attack.

Figure 5:
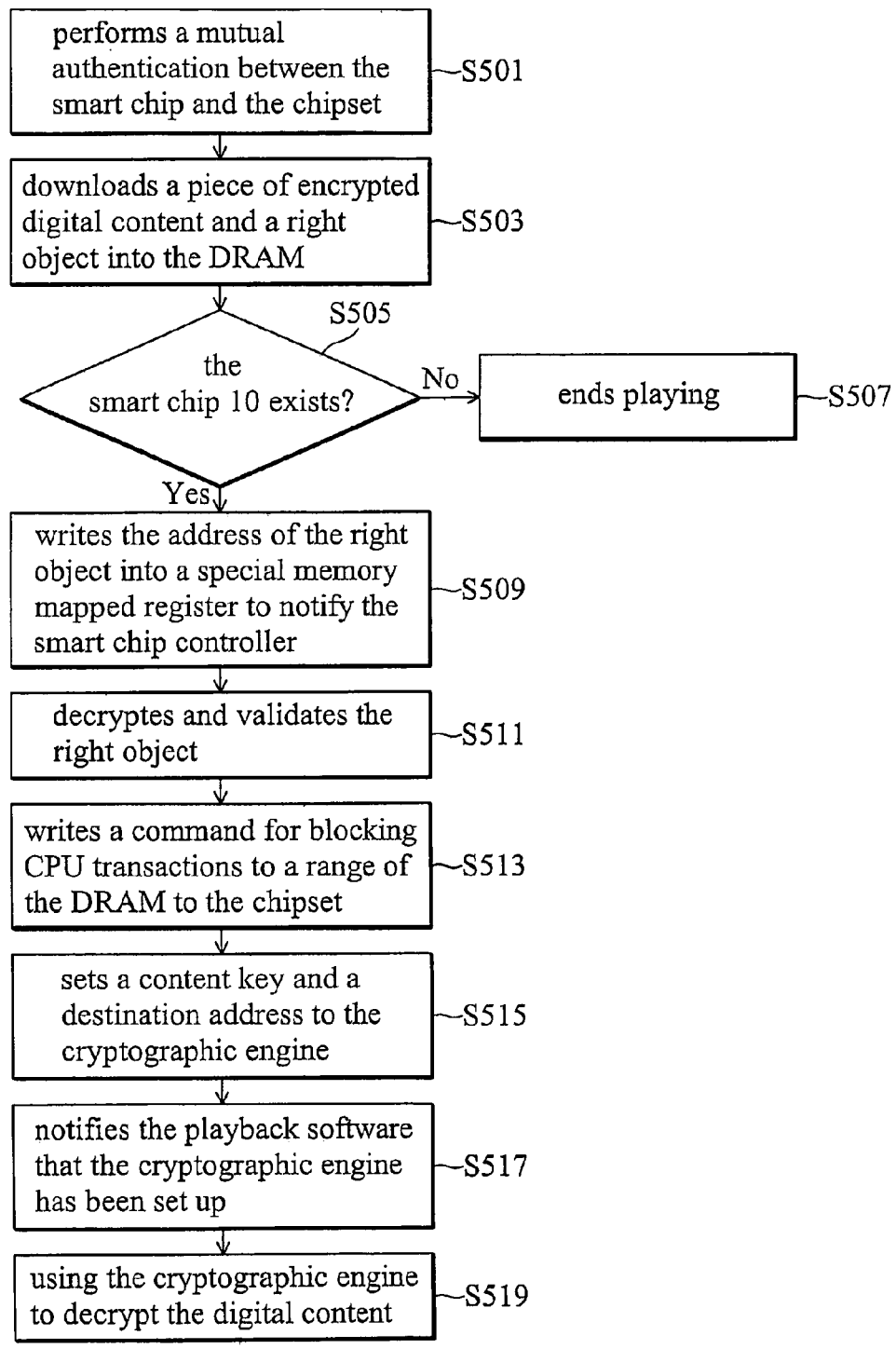
FIG. 5 shows a flowchart diagram illustrating a method for playing digital content of the electronic system.

FIG. 5 shows a flowchart diagram illustrating a method for playing digital content of the electronic system.

In step S501, a mutual authentication between the smart chip 10 and the chipset 20 is performed. For example, the user turns on (i.e., powers up) the electronic system 100 and the electronic system 100 boots up normally with or without the smart chip 10. If the smart chip 10 is present, the mutual authentication is started.

In step 503, a piece of encrypted digital content and a right object are downloaded into the DRAM. For example, a playback software program executed on the CPU puts (downloads) a piece of encrypted digital content into the DRAM 40 and puts (or downloads) a right object associated to the encrypted digital content into the DRAM 40. It should be noted that the right object may be purchased via Internet, and the right object can be assigned by the content provider and encrypted using a user key stored in the smart chip 10. For example, the right object comprises a content key. The smart chip 10 may contain a unique number for identifying users. In some embodiment, the steps for powering-up shown in FIG. 2 and the steps for adding use time shown in FIG. 4 can also be executed before downloading the piece of encrypted digital into the DRAM 40, and the detailed operations are omitted for simplification.

In step S505, whether the smart chip 10 exists is determined. For example, before playing a video, the playback software checks the presence of a valid smart chip 10. If a valid smart chip 10 is absent, step S507 is executed to end playing. On the contrary, if a valid smart chip 10 is present, step S509 is executed.

In step S509, the playback software writes the address of the right object into a special memory mapped register to notify the smart chip controller 25.

In step S511, the right object is decrypted and validated. For example, the right chip controller 25 sends the tenth command (CPU CALL command) to the smart chip 10, and the smart chip 10 receives the tenth command. The smart chip controller 25 then polls the smart chip 10, and the smart chip 10 responds a ninth command (READ MEMORY) to read the right object. The smart chip controller 25 sends an eleventh command (MEMORY DATA command) along with the right object to the smart chip 10, such that the smart chip 10 decrypts and validates the right object to obtain a content key. In some embodiments, the smart chip 10 decrypts right object to obtain the content key by the user key stored in the smart chip 10.

In step S513, a command for blocking CPU transactions to a range of the DRAM 30 is written to the chipset 20. For example, the smart chip controller 25 polls the smart chip 10, and then the smart chip 10 responds the eighth command (WRITE MEMORY command) to write a control register of the access management module 21 so as to block CPU transactions to a range of DRAM 40.

In step S515, a content key and a destination address are set to the cryptographic engine 24. For example, the smart chip controller 25 polls the smart chip 10 again, and then the smart chip 10 responds the eighth command (WRITE MEMORY command) to write the corresponding control register of the cryptographic engine 24 so as to set the content key to the cryptographic engine 24. Then, the smart chip controller 25 polls the smart chip 10, and the smart chip 10 responds the eighth command (WRITE MEMORY command) to write the corresponding control register of the cryptographic engine 24 so as to set the destination address to the cryptographic engine 24. It should be noted that the destination address is in the memory that the CPU 30 cannot read.

In step S517, the playback software is notified that the cryptographic engine 24 has been set up. For example, the smart chip controller 25 polls the smart chip 10, and then the smart chip 10 responds a twelfth command (INTERRUPT command) to the playback software that the cryptographic engine 24 has set up.

In step S519, the digital content is decrypted by the cryptographic engine 24. For example, when receiving the twelfth command, the smart chip controller 25 generates an interrupt signal to the playback software, such that the playback software uses the cryptographic engine 24 to decrypt the digital content and then instructs a video decoder (not shown) to decode it and playback it back on a display (not shown). It should be noted that the playback software, however, is unable to read the decrypted digital content and the content key.

Because the CPU cannot access the sensitive information in the smart chip, DRAM, or chipset, the electronic system can block unauthorized third parties access to important data thereof.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic device comprising:
    a smart chip;
    a system memory accessible to the smart chip and the processor; and
    a chipset, coupled between the processor and the smart chip, and for performing a mutual authentication with the smart chip, wherein the chipset comprises:

a system logic module, disabling some functions of the chipset when the system logic module receives a specific command from the smart chip;

a smart chip controller communicating with the smart chip; and an access management module, coupled between the processor and the smart chip controller, preventing the processor accessing a certain range of the system memory according to a block command from the smart chip controller, in response of that the mutual authentication between the chipset and the smart chip is failed.

2. The electronic device as claimed in claim 1, wherein the smart chip checks time duration of remaining subscription, in response of that the mutual authentication between the chipset and the smart chip has succeed.

3. The electronic device as claimed in claim 2, wherein the access management module blocks any request from processor in response to the block command from the smart chip, given the time duration of remaining subscription is zero.

4. The electronic device as claimed in claim 2, further comprising a cryptographic engine coupled to the smart chip controller for executing BIOS (basic input/output system) verification in response to a verification command from the smart chip.

5. The electronic device as claimed in claim 4, wherein the access management module blocks any request from the processor according to the block command from the smart chip, in response of that the BIOS verification is failed.

6. The electronic device as claimed in claim 1, wherein the processor downloads an encrypted digital content and a right object associated to the encrypted digital content into the system memory, wherein the smart chip decrypts and validates the right object to obtain a content key in response of that the mutual authentication between the chipset and the smart chip has succeed, and wherein the chipset comprises a cryptographic engine to decrypt the encrypted digital content according to the content key from the smart chip.

7. The electronic device as claimed in claim 6, wherein the right object is signed by a content provider of the encrypted digital content and is encrypted by a user key stored in the smart chip.

8. The electronic device as claimed in claim 6, wherein the access management module blocks the processor to access a range of the system memory in response to an invalid right object.

* * * * *